United States Patent
Neubauer

(10) Patent No.: US 9,676,314 B2
(45) Date of Patent: Jun. 13, 2017

(54) TRAILER FOR A TUGGER TRAIN

(71) Applicant: Jungheinrich Aktiengesellschaft, Hamburg (DE)

(72) Inventor: Dirk Neubauer, Lübeck (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 1 day.

(21) Appl. No.: 14/627,209

(22) Filed: Feb. 20, 2015

(65) Prior Publication Data
US 2015/0239383 A1    Aug. 27, 2015

(30) Foreign Application Priority Data

Feb. 24, 2014    (DE) .......................... 10 2014 102 371

(51) Int. Cl.
*B60P 1/02* (2006.01)
*B62D 63/06* (2006.01)

(52) U.S. Cl.
CPC .............. *B60P 1/02* (2013.01); *B60P 1/025* (2013.01); *B62D 63/064* (2013.01); *B62B 2203/72* (2013.01)

(58) Field of Classification Search
CPC . B60P 1/025; B62B 2203/70; B62B 2203/72; B62D 63/064
See application file for complete search history.

(56) References Cited

U.S. PATENT DOCUMENTS

| | | | | |
|---|---|---|---|---|
| 2,230,014 A * | 1/1941 | Raven | ..................... | B60P 1/025 414/495 |
| 2,934,228 A * | 4/1960 | Hillberg | .................. | B60P 1/025 414/458 |
| 4,147,266 A * | 4/1979 | Corompt | ............... | B60P 1/6463 414/498 |
| 4,673,328 A * | 6/1987 | Shiels | ..................... | B60P 1/025 414/495 |
| 4,902,188 A * | 2/1990 | Page | ....................... | B60P 1/025 414/458 |
| 5,411,359 A * | 5/1995 | Kossila | ................... | B60P 1/025 414/498 |

(Continued)

FOREIGN PATENT DOCUMENTS

| | | | | |
|---|---|---|---|---|
| DE | 901517 C | * | 1/1954 | .............. B60P 1/025 |
| DE | 2141816 A1 | * | 3/1973 | .............. B60P 1/025 |

(Continued)

*Primary Examiner* — James Keenan
(74) *Attorney, Agent, or Firm* — Young Basile Hanlon & MacFarlane, P.C.

(57) ABSTRACT

A trailer for a tugger train having a frame, which has a lifting apparatus with a lift platform. An inner wagon to be transported rests in a raised state on the lift platform. The lifting apparatus has a pull/push rod and at least one triangular lever. Each triangular lever is mounted pivotably with a first end on the frame, a second end on the lift platform and a third end on the pull/push rod, wherein the lift platform can be adjusted in height using the triangular lever(s), with which the lift platform performs an arc-shaped pivot movement, and with a lowering movement is lowered to such an extent that the inner wagon is released from the lift platform and is pushed out of the frame, transverse to the lowering direction, by a predetermined path.

12 Claims, 3 Drawing Sheets

(56) References Cited

U.S. PATENT DOCUMENTS

2012/0020762 A1* 1/2012 Roose .................... B60P 1/025
 414/495

FOREIGN PATENT DOCUMENTS

| DE | 2510376 A1 * | 9/1976 | ............. B60P 1/025 |
|----|---|---|---|
| DE | 603 00 189 T2 | 4/2006 | |
| DE | 10 2007 022 525 A1 | 11/2008 | |
| DE | 20 2009 001 933 U1 | 6/2009 | |
| DE | 20 2009 013 359 U1 | 1/2010 | |
| DE | 10 2008 060 962 A1 | 3/2010 | |
| EP | 2415635 A1 * | 2/2012 | ............. B60P 1/025 |
| JP | H10-291473 A | 11/1998 | |
| WO | WO 2012/046027 A1 * | 4/2012 | ............. B60P 1/025 |

* cited by examiner

TRAILER FOR A TUGGER TRAIN

CROSS-REFERENCE TO RELATED APPLICATION

This application claims priority to German Patent Application No. DE 10 2014 102 371.4, filed Feb. 24, 2014, the content of which is incorporated herein in its entirety by reference.

TECHNICAL FIELD

The present invention relates to a trailer for a tugger train having a frame which has a lifting apparatus with a lift platform.

BACKGROUND

Tugger trains are used in intralogistics for in-plant transport of products and materials. The trains often travel on fixed preset routes, with a travel plan that is fixed to some extent, in order to transport materials to so-called stopping places or stations. The tugger train itself is comprised of a vehicle that tows one or more trailers. The trailer receives so-called inner wagons, which can be trolleys, roller pallets, basket wagons and the like. The inner wagon travels in the tugger train using the trailer. Here, the inner wagon itself can travel, and be merely guided by the trailer, or the inner wagon is raised into the trailer and during transport moves using the trailer without contacting the floor.

A train trailer is known from document DE 10 2007 022 525 A1, which has a frame for receiving an inner wagon positioned within the frame and at least one centrally arranged rigid axle. With this known train trailer, the inner wagon to be transported is pulled onto the crossbar using a sled arranged on a central crossbar and locked there.

A U-shaped trailer for an inner wagon known from document JP 10-291473 has four lifting apparatuses on the frame thereof for lifting an inserted inner wagon.

A trailer for a transport train is known from document DE 603 00 189 T2, wherein the trailer has a central strut upon which the inner wagon can be slid.

A system for pushing out a train trailer is known from document DE 10 2007 022 525 A1, which pushes out a transported inner wagon after transport in order to align the wheels thereof.

SUMMARY

According to the teachings herein, a trailer for a tugger train is provided that interacts in a simple manner with an inner wagon to be transported, and whose handling facilitates removal of the inner wagon.

One trailer described herein has a frame which has a lifting apparatus with a lift platform. The inner wagon to be transported is pushed into the frame, onto or over the lift platform, which is raised using the lifting apparatus, in order to move the inner wagon in the raised state thereof using the trailer without contacting the floor. The lift platform, with a lowering process, is lowered to the extent that the inner wagon is released from the lift platform. Experience has shown with a lowering process of the lift platform, the inner wagon is pushed out of the frame transverse to the lowering direction by a predetermined path, wherein the inner wagon already contacts the floor. The lowering movement of the lift platform comprises two movement components, one movement component that describes the lowering, and one movement component that describes the advancing movement of the inner wagon. Due to advancing movement, the inner wagon with the wheels thereof is directly aligned at the completion of the lowering movement in order to push the inner wagon by hand, without aligning the wheels. During transport in the raised state, the steerable wheels of the inner wagon generally take on a random positioning. An alignment of the steerable wheels on the inner wagon occurs due to the lowering movement, with which a movement component is also provided to push out the inner wagon on the frame. Especially with a heavily loaded inner wagon, the inner wagon can then be pushed directly without aligning the steerable wheels.

The lifting apparatus may be equipped with a pull/push rod and have at least one triangular lever. The triangular lever is mounted pivotably with a first end thereof on the frame, a second end thereof on the lift platform and a third end thereof on the pull/push rod. For raising or lowering the lift platform, the triangular lever is pivoted using the pull/push rod, wherein the pivot axis is formed by the first end of the triangular lever arranged fastened to the frame. The end of the triangular lever connected pivotably to the lift platform describes an arc-shaped movement lying substantially on a circular track. With respect to the lift platform, the use of a triangular lever means that the lift platform also describes a pivot movement on an arc-shaped track. This pivot movement realizes precisely a movement that is comprised of superimposing a lowering movement and an ejecting movement. The triangular lever is advantageously arranged such that the lift platform with a lowering movement describes approximately a quarter of a circle. The pull/push rod is subjected to compressive loading with one movement, and with movement in the other direction is subjected to tensile loading.

In one design, the trailer has a U-shaped frame having two limbs arranged preferably in parallel to each other, and a longitudinal strut connecting the limbs. The lift platform is arranged on the longitudinal strut between the limbs. Overall, the frame with the lift platform forms a substantially E-shaped contour. For transport, the inner wagon is pushed into the frame from the open side, wherein the inner wagon here may also protrude over the limbs and/or the longitudinal strut. The inserted inner wagon is then raised using the lift platform to the extent that the inner wagon is clear of the floor. In the raised position, the inner wagon is then moved using the trailer.

In a further design, the lift platform is equipped with an ejector projection which interacts with an inner wagon to be transported. During the lowering movement of the lift platform, the ejector projection pushes the inner wagon out of the frame. The inner wagon arranged on the lift platform rests on the ejector projection of the lift platform. Due to the preferred arc-shaped pivot movement of the lift platform during the lowering movement, the ejector projection pushes the inner wagon forwards out of the frame. With this advance, the wheels of the inner wagon are aligned in the direction of the advance. Here, the wheels align precisely in the direction in which the inner wagon can be pushed completely out of the frame of the trailer.

In a design, the ejector projection is implemented as a web on the lift platform, arranged parallel to the frame and to the longitudinal limb. In this design, the ejector projection serves as a stop for an inner wagon pushed onto the lift platform. The inner wagon is then pushed up to the ejector projection and lies thereupon. During the putting down movement, the ejector projection transmits the transverse movement of the lift platform onto the lowered inner wagon.

In a design, the lifting apparatus is implemented as an electro-hydraulic unit, which actuates at least one pull/push rod for raising and lowering the lift platform. The advance movement of the lifting apparatus out of the frame can be additionally supported by a spring element which brings an additional force for the advance movement.

BRIEF DESCRIPTION OF THE DRAWINGS

Certain embodiments of the invention are described in more detail in the following using the drawings. In the figures, like elements are referred to with the same references and.

DETAILED DESCRIPTION

Figure 1:
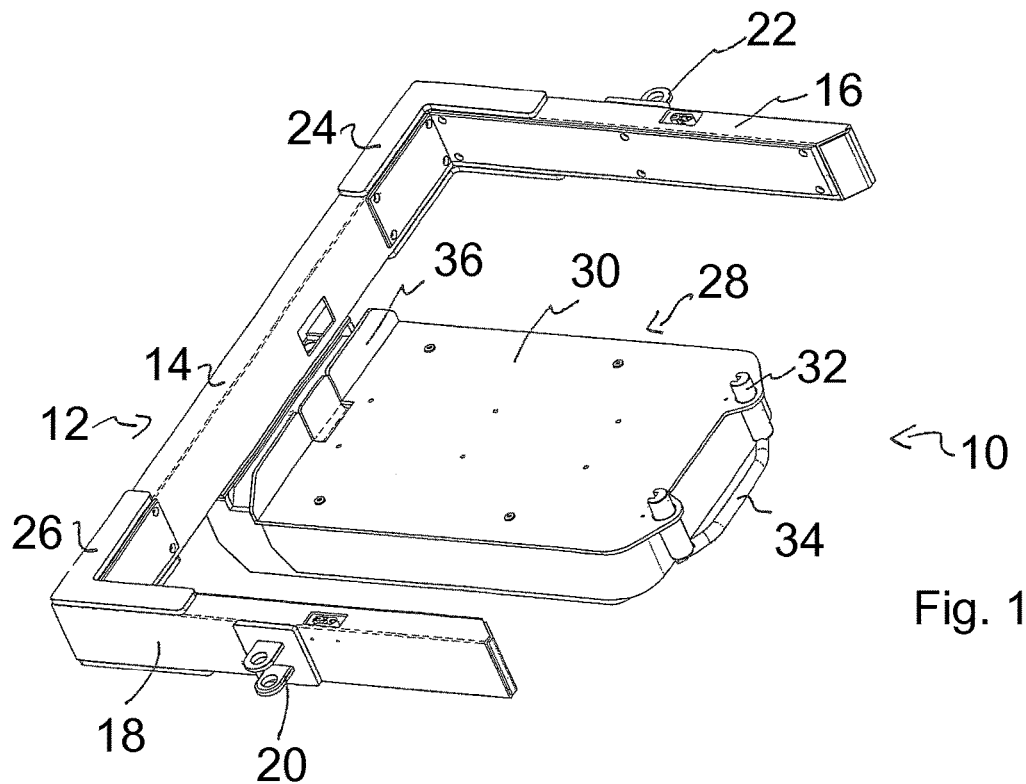
FIG. 1 is a trailer according to an embodiment of the invention with a lowered lift platform.

FIG. 1 shows a trailer 10 according to the invention, which has a U-shaped frame 12. The frame 12 has a longitudinal strut 14 at the ends of which two parallel limbs 16, 18 are provided. In the represented embodiment of the trailer 10 according to FIG. 1, a trailer eye 20 is provided on the limb 18. A corresponding trailer eye 22 is provided on the opposite limb 16. The trailer eyes 20, 22 can be connected using a whippletree (not shown), to respective ends of the whippletree in order to form a towed tugger train. In the region of the connection between the longitudinal strut 14 and the limbs 16, 18, additional stiffening brackets 24, 26 are provided which confer sufficient rigidity to the frame 12.

Figure 2:
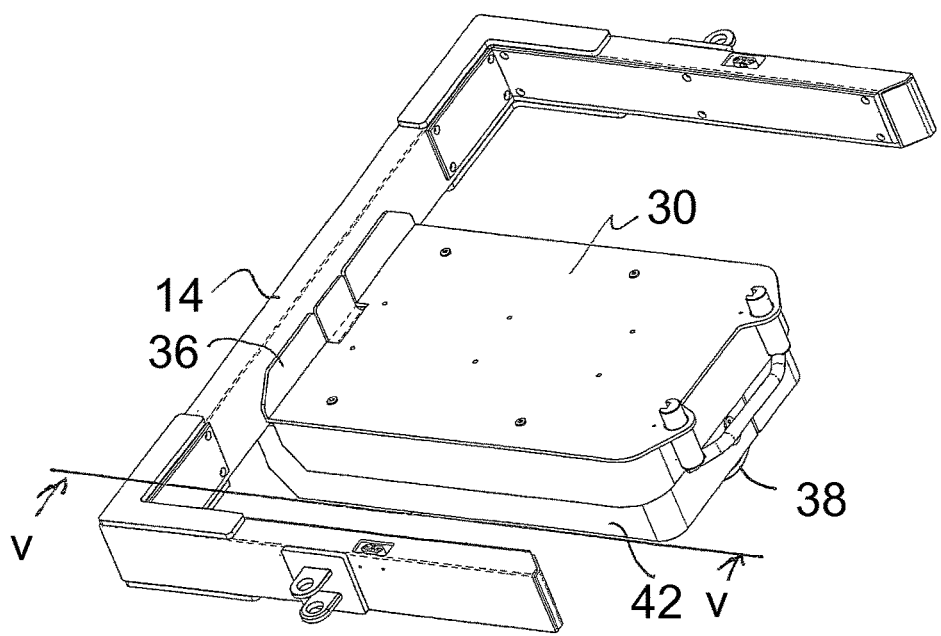
FIG. 2 is the trailer according to FIG. 1 with a raised lift platform.

A lifting apparatus 28 with a lift platform 30 is provided between the limbs 16 and 18. The lift platform 30 provides a substantially planar area upon which an inner wagon to be transported can be set down on the floor plate thereof. The lift platform 30 can be raised using lifting means arranged beneath the lift platform 30 (see FIG. 2). The lift platform 30 has an advance web 36 on the ends thereof pointing towards the longitudinal strut 14, against which the inner wagon, pushed on and raised, abuts. As seen in FIG. 1, and here in particular in comparison to FIG. 2, FIG. 1 shows the lowered position of the lift platform in which the advance web 36 is at a distance from the longitudinal strut 14. In the raised position of the lift platform 30, as seen in FIG. 2, the advance web 36 abuts against the longitudinal strut 14.

FIG. 1 further shows two locking pins 32, which can be released and/or actuated using the actuating element 34. The locking pins 32 serve to secure an inner wagon located on the lifting apparatus 28 for transport, and to prevent the inner wagon from sliding down from the lift platform 30. During removal of the inner wagon, the locking pins 32 can be released using the actuating element 34.

Figure 3:
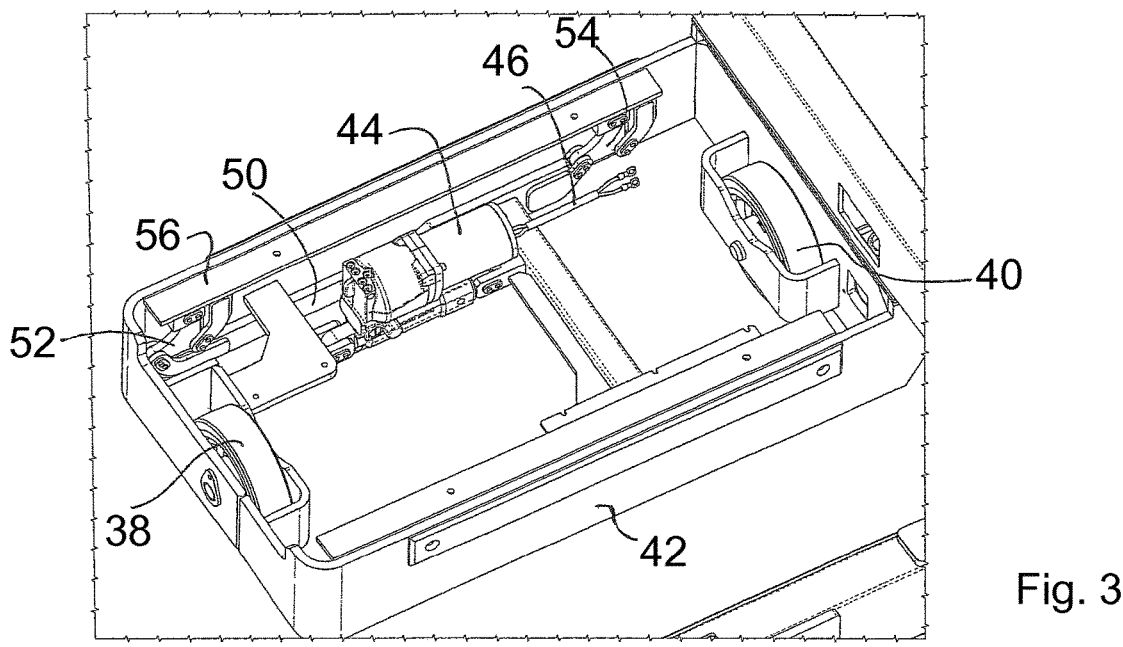
FIG. 3 is a view in the lift direction in the lowered state, with removed lift platform.
Figure 4:
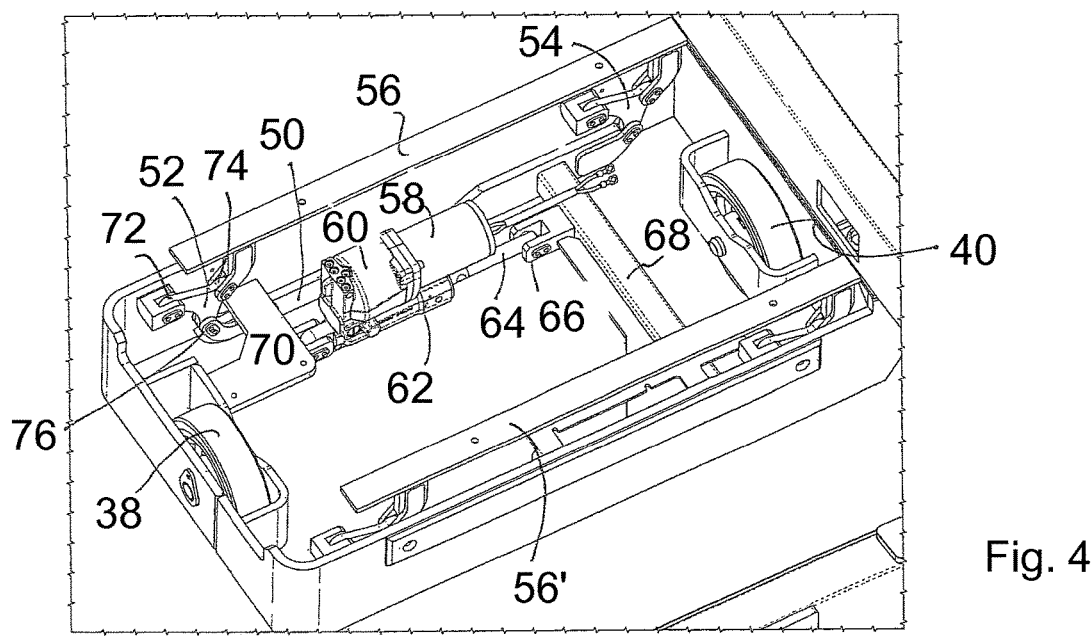
FIG. 4 is the lifting apparatus from FIG. 3 in the raised state.

The trailer sits on two wheels attached securely to the frame at the lifting apparatus 28. FIG. 2 shows the wheel 38 pointing away from the longitudinal strut 14, while FIGS. 3 and 4 show both wheels 38 and 40. The wheels 38, 40 are aligned fixed in the pull direction of the trailer, and can rotate independently of each other, for example for traveling in a curve.

As seen in FIGS. 1 and 2, the lifting apparatus 28 is comprised of a middle section 42 provided secured to the frame that is arranged lower than the limbs 16, 18 and the longitudinal strut 14. The middle section 42, which is open upwards, is closed by the lift platform 30, wherein the power unit and the gearing for raising the lift platform 30 are arranged in the middle section 42.

FIG. 3 shows a view into the middle section 42 with the lift platform 30 removed. Clearly seen here are the two wheels 38, 40 that cannot be steered in this implementation, which are held secured to the frame 12 on the middle section 42. Furthermore, an electro-hydraulic compact power unit 44 is provided which is supplied electricity via an electrical supply line 46 (not connected in FIG. 3). The compact power unit 44 actuates a pull/push rod 50, which engages at a front triangular lever 52 and a rear triangular lever 54. As seen in FIG. 3, in the lowered position, the pull/push rod 50 is pushed into a position in which a bearing rail 56 for the lift platform 30 is lowered. Due to a movement of the pull/push rod 50, the triangular levers 52, 54 are pivoted, and the bearing rail 56 for the lift platform is raised. The design is repeated on the bearing rail 56' on the other side, which is also raised and lowered using two triangular levers and pull/push rod acting in between (not shown in FIG. 3).

As seen in FIG. 4, the compact power unit 44 is comprised of an electric motor 58, which drives a hydraulic pump 60 for a hydraulic cylinder 62 lying below. The hydraulic cylinder 62 has a piston rod 64, which is arranged pivotably on a crossbar 68 via an eye 66. The crossbar 68 is connected at opposing ends thereof to each pull/push rod 50, which at the free ends thereof are connected pivotably to respective pairs of the triangular levers 52, 54. The crossbar 68 and the pull/push rods 50 form an H-shaped frame, which is adjusted using the hydraulic cylinder 62. The hydraulic cylinder 62 at the end opposite thereof from the piston rod 64 is arranged secured to the frame at a bracket element 70. Both the lift movement and the lowering movement occur with an adjustment movement of the lift platform 30, or respectively the attachment rail 56, due to an actuation of the hydraulic cylinder 62. In addition, a spring element can be provided that is compressed in the raised state, and relaxes during a lowering movement to support the push out of the inner wagon. The spring element can be provided integrally in the hydraulic cylinder 62 or separately, for example as a pneumatic spring.

The triangular levers 52, 54 on a first end 72 thereof are arranged pivotably on the frame 12. The second end 74 is pivotably connected to the lift platform 30 via the attachment rail 56, wherein the attachment rail 56 as seen in FIGS. 3 and 4 is arranged on the lift platform 30. The third end 76 of the triangular levers 52, 54 is connected to the pull/push rod 50. Each of the four triangular levers are the same in this implementation, so only one is labeled in FIG. 4.

With an actuation of the hydraulic cylinder 62, the piston rod 64 moves the crossbar 68 and the third ends 76 of the triangular levers 52, 54 via the pull/push rod 50. Due to the movement, the second ends 74 pivot in a circular arc, the center of which lies in the junction wherein the first ends 72 are secured to the frame 12. With the lifting process, the hydraulic power unit (e.g., the compact power unit 44) is actuated and the hydraulic cylinder 62 is pressurized with hydraulic fluid. With the lowering process, a valve (not shown) opens, and the hydraulic fluid is drained. Due to the arrangement of the triangular levers 52, 54, the lift platform 30 transitions from the lowering process into a horizontal push movement, and the inner wagon, already contacting the floor, is pushed during the push process out of the frame 12. In order to support this push movement, the spring element is provided, for example in the form of a pneumatic spring, which is compressed in the raised state, and during the lowering procedure relaxes increasingly due to a movement in the pushing out direction. The spring element acts substantially in parallel to the hydraulic cylinder 62.

Along with the described compact power unit 44, it is also possible to use differently implemented hydraulic power units. Furthermore, purely electrical drives, such as spindle drives can also be used. With an electrical drive, which is driven also during a lowering movement, the supporting effect of the spring element can be omitted.

Figure 5:
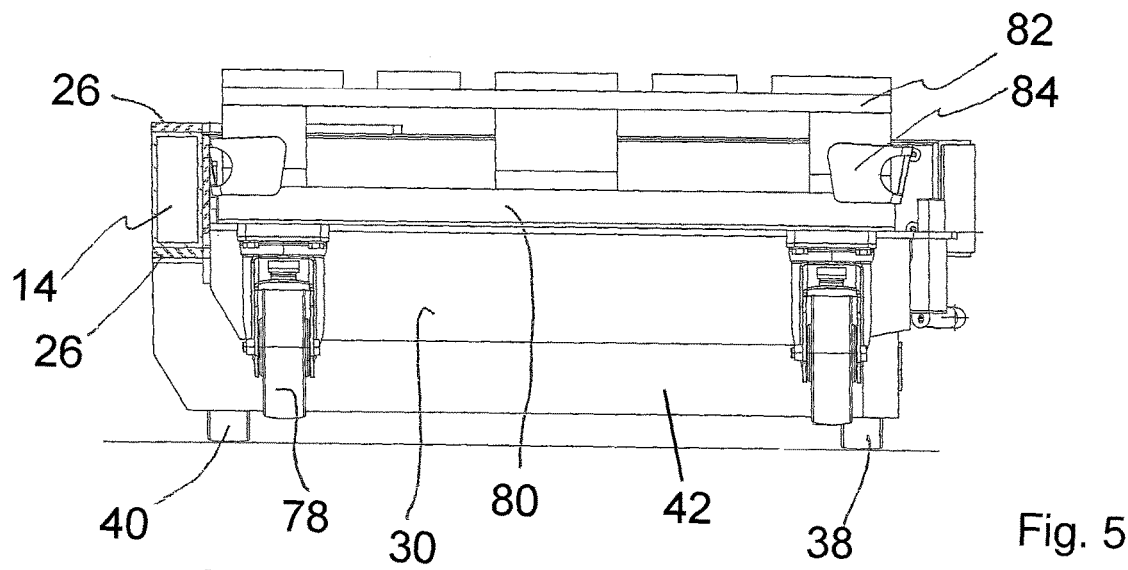
FIG. 5 is a sectional view along the line V-V from FIG. 2, with a raised inner wagon.

FIG. 5 shows a sectional view along the V-V line from FIG. 2 with a raised inner wagon. The cut longitudinal strut 14 and the stiffening bracket 26 arranged in the corners thereof can be seen in FIG. 5. The inner wagon has wheels or casters 78, which are arranged on a wagon floor 80. An empty pallet 82, which is secured at the corners thereof to the wagon floor 80 using retainers 84, stands on the wagon floor 80. The inner wagon is raised so that the wheels 78 are cleared of the floor. It can be further seen here that the wheels 38, 40 of the trailer 12 project from the middle section 42 of the lifting apparatus 28, and are in contact with the floor.

Figure 6:
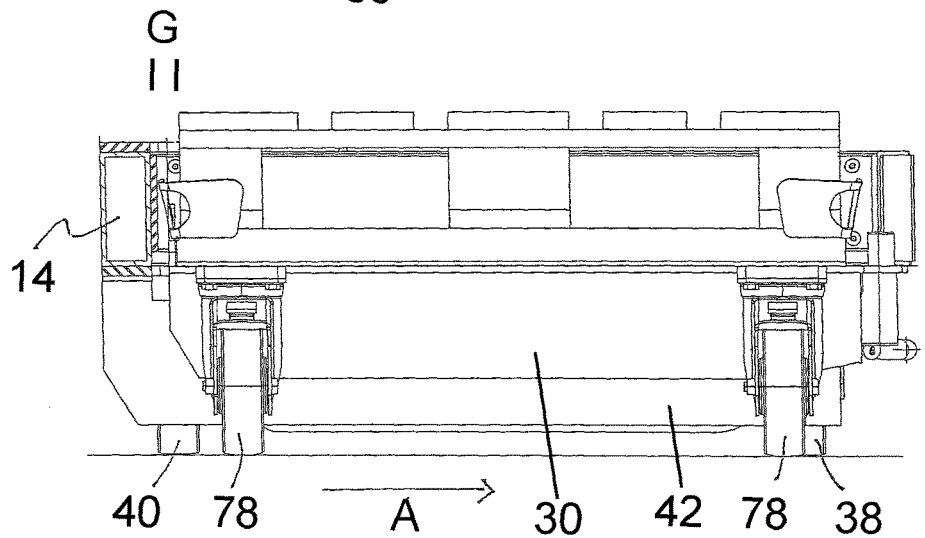
FIG. 6 is a sectional view along the line V-V from FIG. 2, with the inner wagon just lowered.
Figure 7:
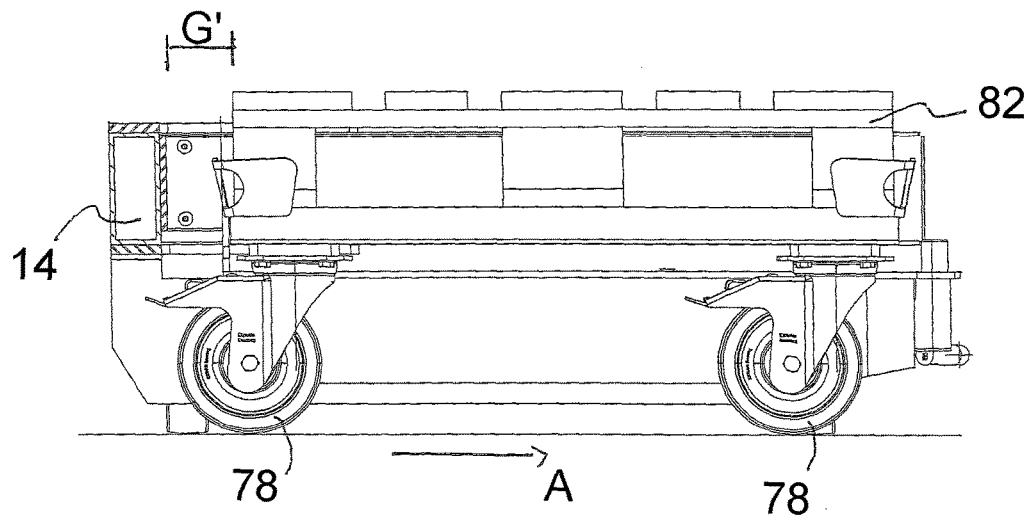
FIG. 7 is a sectional view along the line V-V from FIG. 2, with the inner wagon pushed out.

FIG. 6 shows the just lowered inner wagon, with which the casters 78 begin to rest on the floor. As seen in FIG. 6, the casters 78 still have an orientation transverse to the push out direction A. With the lowering movement, there is a distance G between the longitudinal strut 14 and the associated edge of the pallet 82. FIG. 7 shows the inner wagon, completely lowered and advanced in direction A, in which the distance between the longitudinal strut 14 and the edge of the pallet 82 has increased to G'. As can be seen, the wheels 78 are now aligned, in order to better utilize the inner wagon.

The invention claimed is:

1. A trailer for a tugger train, comprising:
   a frame;
   a lift platform having a lowered state in which an inner wagon supported on the lift platform is in contact with a travel surface and a raised state in which the inner wagon is supported for transportation without contact with the travel surface; and
   a lifting apparatus for moving the lift platform between the raised state and the lowered state, the lifting apparatus comprising:
      a support section secured to the frame and extending to a position closer to the travel surface than the frame, the support section arranged beneath the lift platform;
      a pull/push rod; and
      at least one triangular lever having a first end pivotally coupled to a surface of the support section that extends vertically relative to the travel surface, a second end pivotally coupled to a lower surface of the lift platform, and a third end pivotally coupled to the pull/push rod, the at least one triangular lever, having pivoting movement between a first position where the lift platform is in the raised state and a second position where the lift platform is in the lowered state, the pivoting movement of the at least one triangular lever causing the lift platform to perform an arc-shaped pivot movement such that the lift platform abuts the frame in the raised position and is spaced apart from the frame, in a direction transverse to a lowering direction, in the lowered position.

2. The trailer according to claim 1, wherein the frame is a U-shaped frame having two limbs and a longitudinal strut connecting to each of the two limbs, the two limbs extending in the direction transverse to the lowering direction, and wherein the lifting apparatus is coupled to the longitudinal strut between the two limbs and extends in the direction transverse to the lowering direction.

3. The trailer according to claim 2, wherein the lift platform has an ejector projection that abuts the longitudinal strut in the raised position, and is spaced apart from the longitudinal strut in the lowered position, the ejection projection providing a support for the inner wagon such that the inner wagon advances in a direction out of the frame during movement of the lift platform in the lowering direction.

4. The trailer according to claim 3, wherein the ejector projection comprises a web on the lift platform extending vertically relative to the travel surface.

5. The trailer according to claim 1, wherein the lift platform has an ejector projection that abuts the frame in the raised position, and is spaced apart from the frame in the lowered position, the ejection projection providing a support for the inner wagon such that the inner wagon advances in a direction out of the frame during movement of the lift platform in the lowering direction.

6. The trailer according to claim 1, wherein the lifting apparatus has an electrohydraulic unit that actuates the pull/push rod for raising and lowering the lift platform relative to the support section.

7. The trailer according to claim 1, wherein the lifting apparatus has a spring element that relaxes with lowering movement of the lift platform relative to the support section and advances the lift platform in a direction out of the frame during the lowering movement.

8. The trailer according to claim 1, wherein the frame is a U-shaped frame having two limbs and a longitudinal strut extending between the two limbs, the two limbs extending in the direction transverse to the lowering direction, and wherein the lifting apparatus is coupled to the longitudinal strut between the two limbs such that the lift platform abuts the longitudinal strut in the raised position and is spaced apart from the longitudinal strut in the lowered position.

9. The trailer according to claim 8, further comprising:
   a rear wheel extending from a bottom surface at a first end of the support section adjacent the longitudinal strut and in contact with the travel surface; and
   a front wheel extending from the bottom surface at a second end of the support section opposite the longitudinal strut and in contact with the travel surface.

10. The trailer according to claim 9, wherein each of the front wheel and the rear wheel is mounted fixed for rotation in a direction parallel to the longitudinal strut.

11. The trailer according to claim 1, further comprising the inner wagon, the inner wagon having wheels extending from a bottom surface that are randomly aligned when the lift platform is in the raised position, and align for travel of the inner wagon in the direction transverse to the lowering direction when the lift platform reaches the lowered position and before the inner wagon is released from the lift platform.

12. The trailer according to claim 1, wherein the support section comprises attachment rails extending parallel to each other on opposite sides of the support section and coupled to the lower surface of the lift platform, the at least one triangular lever comprising a triangular lever at each opposing end of the attachment rails, and each second end pivotally coupled to the lower surface of the lift platform via the attachment rails.

* * * * *